Feb. 25, 1947.   W. W. HANSEN ET AL   2,416,310
HIGH FREQUENCY PHASE MEASURING APPARATUS
Filed Nov. 5, 1942   2 Sheets-Sheet 1
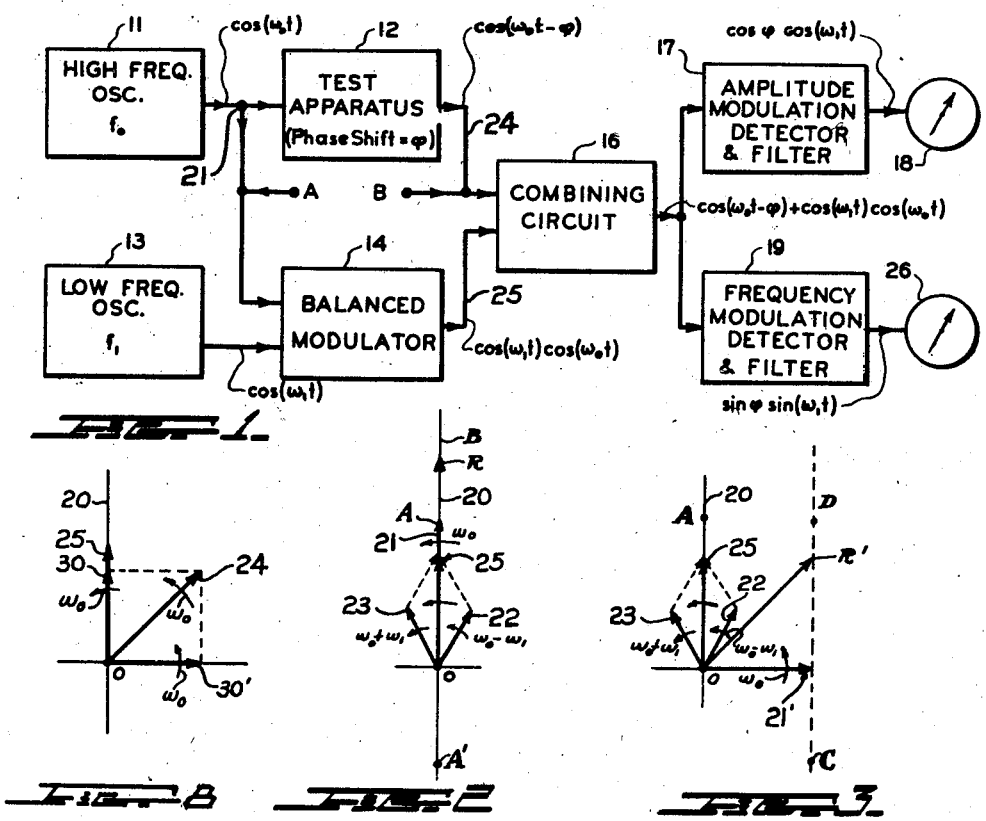
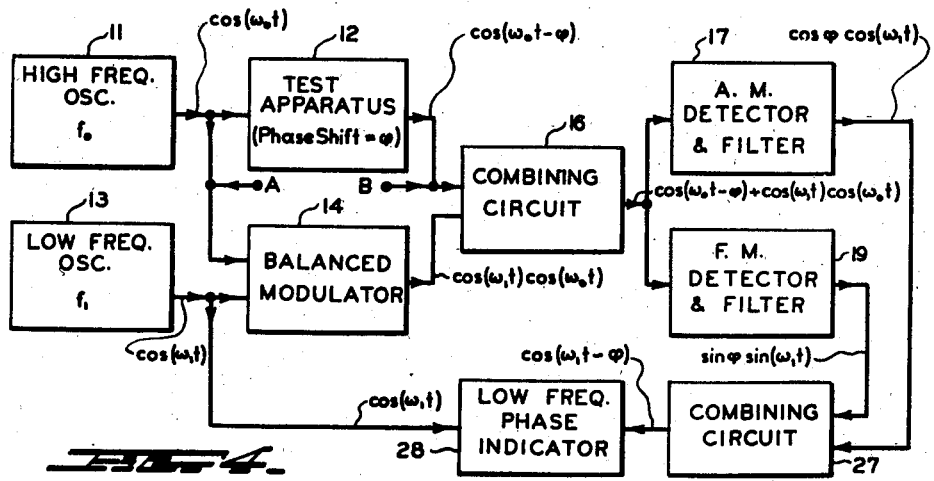
INVENTORS,
WILLIAM W. HANSEN
MORRIS RELSON
BY
THEIR ATTORNEY.

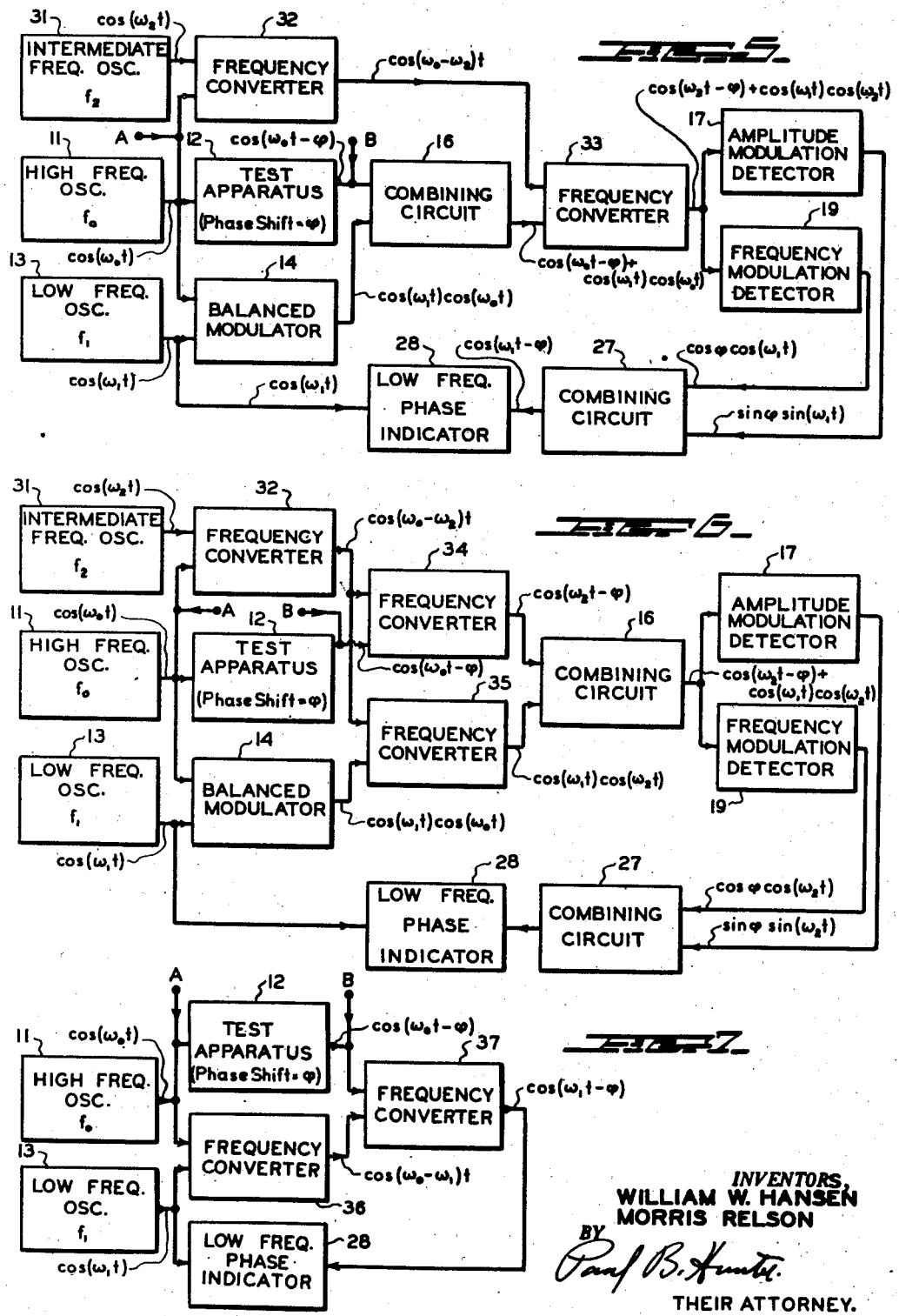

Patented Feb. 25, 1947

2,416,310

UNITED STATES PATENT OFFICE 2,416,310

HIGH-FREQUENCY PHASE MEASURING APPARATUS

William W. Hansen, Garden City, and Morris Rekson, Kew Gardens, N. Y., assignors to Sperry Gyroscope Company, Inc., Brooklyn, N. Y., a corporation of New York Application November 5, 1942, Serial No. 464,613

22 Claims. (Cl. 172—245)

1

The present invention relates to the art including phase measuring circuits, especially for high radio frequencies.

In many instances it is necessary or desirable to measure the phase delay introduced into a circuit by a particular piece of apparatus at high radio frequencies. It may also be desirable to measure this phase delay for varying frequencies, for instance over a complete range of frequencies as in the case of filter or time delay lines, for the purpose of measuring their phase shift versus frequency characteristics.

The accurate measurement of phase shifts at high radio frequencies has been very difficult and complicated up to the present time. Known methods are adapted to measure such phase shifts only at predetermined fixed frequencies and must be carefully adjusted and manipulated during measurement to prevent frequency drift with respect to the measuring apparatus.

By the present invention an improved phase shift measuring circuit is provided adapted for operation with radio frequencies which may be varied over a wide range. This is done in the present case by converting the phase shift of the high variable radio frequency to an equivalent phase shift of a low constant frequency which is thereafter measured.

The low frequency may be selected within a range in which phase measurement is quite simple, such as in the medium audio frequency range. This low frequency is made independent of the high radio frequency at which measurements are to be made and, accordingly, the entire device is rendered substantially independent of the value of the radio frequency used for the test.

Accordingly, it is an object of the present invention to provide an improved method for measuring phase-shift and an improved phase-shift measuring circuit adapted for use in measuring the phase shift of circuit apparatus at high radio frequencies.

It is another object of the present invention to provide improved phase shift measuring apparatus suitable for use in measuring the phase shift of circuit apparatus with varying high radio frequencies, whereby the phase shift versus frequency characteristics of such apparatus may be easily determined.

It is still another object of the present invention to provide improved high frequency phase-shift measuring apparatus in which the high frequency phase shift to be measured is converted by an improved means to a corresponding phase shift at a fixed low frequency independent thereof.

Other objects and advantages of the present invention will become apparent from the following specification and drawings, wherein, Fig. 1 shows a schematic block diagram of one embodiment of the present invention, Figs. 2 and 3 show vector diagrams useful in explaining the operation of the invention, Fig. 4 shows a schematic block diagram of a modified form of the invention, and Figs. 5, 6 and 7 show schematic block diagrams of further embodiments of the invention.

Fig. 8 is an additional vector diagram useful in explaining the operation of the invention.

Referring now to Fig. 1, there is provided an oscillator 11 which may be any suitable source of high radio frequency oscillations of frequency $f_0$ at which frequency the phase shift $\phi$ of the apparatus under test, such as indicated by the block 12, is to be measured. Assuming that the output voltage of oscillator 11 may be instantaneously represented by the expression $\cos \omega_0 t$, this wave is passed through the test apparatus 12 and will appear in the output thereof as a wave having the form $\cos(\omega_0 t - \phi)$, being delayed in phase therein by the amount $\phi$ which is to be measured.

There is also provided a further oscillator 13 of any suitable type, preferably of a low frequency $f_1$ which may be in the intermediate audio frequency range or of any other value adapted for simple measurement of phase or amplitude. The output wave of oscillator 13 will then have the form $\cos \omega_1 t$. This output wave is modulated upon either the output wave of oscillator 11 or of test apparatus 12 in a balanced modulator 14, which, as is well known, serves to suppress the carrier frequency corresponding to the frequency $f_0$ of oscillator 11. Any conventional balanced modulator or carrier-suppressing modulator may be used here. If, for illustration, the output of oscillator 11 is so modulated, the output wave from balanced modulator 14 will have the wave shape $\cos(\omega_1 t) \cdot \cos(\omega_0 t)$, and this wave is additively combined with the wave output from test apparatus 12 in a suitable combining circuit 16 to produce in its output a wave having the form $$\cos(\omega_0 t - \phi) + \cos(\omega_1 t) \cos(\omega_0 t) \quad (1)$$

Combining circuit 16 may be any suitable circuit for additively combining the two waves supplied thereto. This latter wave is then fed to an ordinary amplitude modulation detector and filter 17 which serves to rectify this wave and to suppress all direct current and all components of the rectified wave exceeding the frequency $f_1$ of oscillator 13.

The detector 17 is chosen to be of the square law type, and will effectively serve to square the wave (1), to thereby produce a wave having the form $$\cos^2(\omega_0 t - \phi) + 2\cos(\omega_0 t - \phi)\cos(\omega_1 t)$$
$$\cos(\omega_0 t) + \cos^2(\omega_1 t)\cos^2(\omega_0 t) \qquad (2)$$

It will be clear that the first and last terms of expression (2) contain both components having frequencies of the order of $2f_0$ and direct current components, both of which are suppressed by the filter portion of circuit 17. The second term of expression (2) may, by trigonometrical manipulation, be shown to be equal to:

$$\cos \phi \cos(\omega_1 t)$$

and this wave will be passed to the output of device 17. This output then comprises a wave of frequency $f_1$ having amplitude proportional to the cosine of the phase shift $\phi$ produced in the test apparatus 12. Accordingly, to measure this phase shift it is merely necessary to provide an indicator, such as 18, adapted to indicate the amplitude of a wave of frequency $f_1$. If desired, this indicator may be directly calibrated to indicate phase shift $\phi$.

As an alternative measuring and indicating circuit, the output of combining circuit 16 may be fed to a frequency modulation detector and filter 19. For an explanation of the operation of this detector 19, reference is first made to Figs. 2 and 3.

Fig. 2 shows a vector diagram of an ordinary carrier wave 21, amplitude modulated (without carrier suppression) by a modulation angular velocity $\omega_1$. Thus, as here shown, the instantaneous magnitude and phase of the resultant modulated wave may be derived as the resultant R of three vectors; namely: vector 21, which is proportional in length to the amplitude of the carrier and rotates at an angular velocity $\omega_0$; vector 22, which is proportional in length to half the amplitude of the modulating frequency and rotates at an angular velocity $\omega_0 - \omega_1$; and vector 23, which is equal in length to vector 22 but rotates at an angular velocity $\omega_0 + \omega_1$. It will therefore be seen that the resultant R of these three vectors, representing the modulated wave, will be a vector along the direction of vector 21 periodically varying in magnitude at the frequency of modulation corresponding to the angular velocity $\omega_1$. The instantaneous magnitude of the modulated (without carrier suppression) wave is then the length of this resultant vector R which lies along the vertical axis 20.

Referring to Fig. 2, the vector 21, representing the carrier, has a fixed length OA. However, the vector 25, representing the resultant of the sidebands, has a length which varies between the length $-OA$ and $+OA$, and the locus of the tip of the vector 21 is a line AA'. The resultant vector R is fixed in direction and varies in length between zero and OB, which is twice OA, and the locus of the tip of the vector R is the line OB.

In the case of a frequency modulated wave, however, the vector representing the carrier is displaced 90 degrees from the resultant of the sideband vectors. In Fig. 3, illustrating frequency modulation, the sideband vectors 22 and 23 are shown, for the sake of comparison, in the same position as in Fig. 2. However, the carrier must be represented by a vector 21' which is perpendicular to the position in which vector 21, of Fig. 2, is shown. The vector 21' is thus perpendicular to the sideband resultant 25. The resultant of the three vectors, 22, 23 and 21', namely, the vector R', no longer has a constant phase angle with respect to the carrier vector 21' or with respect to the resultant sideband vector 25 as was the case in Fig. 2, but varies periodically in phase with respect to the fixed angle vectors 21' and 25, at a rate determined by the modulation frequency $f_1$. Such a wave, when passed through a frequency modulation detector such as the device 19, will produce in the detector output a wave having the frequency $f_1$.

As in the case of Fig. 2, the vector 25 has a fixed direction and a constantly varying length. The vector 21' also has a fixed direction and a fixed length. As the length of the vector 25 varies, the length of the resultant R' also varies, but the angular position thereof varies as well. The locus of the tip of the vector R' is a line CD parallel to the line OA, and having twice the length of OA.

Amplitude modulation detectors such as the device 17 are so constructed as to be responsive to in-phase variations in magnitude, as represented by Fig. 2, and frequency modulation detector, such as represented by the device 19, are so constructed as to be responsive to angular variations, as represented in Fig. 3, but frequency modulation detectors are unresponsive to variations in magnitude.

Referring to Fig. 1, showing an arrangement in which the carrier wave is suppressed by the balanced modulator 14, it will be observed, that if there is no phase shift in the test apparatus 12 the output of the test apparatus 12 will be in phase with the oscillator 11. Since the output of the oscillator 11 is the carrier wave, the effect will be the equivalent of reintroducing the carrier wave in the output of the combining circuit 16. The output of the oscillator 11 may be represented by the vector 21, and the output of the balanced modulator 14 may be represented by the vector 25. If these two vectors are combined in the combining circuit 16, the output may be represented by the resultant R, as shown in Fig. 2.

Ordinarily, however, some phase shift takes place in the test wave apparatus 12, and the output thereof, which may be represented by a vector 24 is neither in phase nor 90 degrees out of phase with the sideband resultant vector 25, but at an intermediate angle thereto, as represented in Fig. 8. Since the combining circuit 16 combines the sideband resultant vector 25 of variable length, and the second vector 24 of fixed length, the vector 24 may be regarded as a carrier vector, analogous to the situation represented in Figs. 2 and 3. However, the situation of Fig. 8 represents neither pure amplitude modulation nor pure frequency modulation. The combined output of the combining circuit 16, therefore, represents a wave having both amplitude and frequency modulation.

The relative amounts of amplitude modulation and frequency modulation depend upon the phase shift $\phi$ produced by the test apparatus 12. Since an amplitude modulation detector, such as the device 17, is responsive only to in-phase modulation or variation magnitude, and a frequency modulation detector, such as the device 19, is responsive only to angular variation independent of magnitude or length of a vector, the vector 24, as shown in Fig. 8, may be resolved into two carrier components 30 and 30', respectively, in phase and in quadrature with the vector 25, representing the resultant of the sidebands 22 and 23.

The detector 17 effectively utilizes only the component 30 of the vector 24 in phase with the vector 21 to combine with the resultant 25 of the sideband vectors 22 and 23 to produce an output which is measured in the indicator 18. The in-phase component 30 bears a ratio of cos $\phi$ to the output 24 of the test apparatus 12, and a proportionate output is measured by the indicator 18.

On the other hand the component 30' of the vector 24 utilized by the frequency modulation detector 19 is smaller than the vector 24 in the ratio sine $\phi$, and the measured output is reduced in proportion. Accordingly, the frequency-modulation detector 17 will have an output wave shape sin $\phi$ sin $\omega_1 t$, which may be indicated in another indicator 26, similar to indicator 18, which may also be calibrated directly in terms of the phase shift $\phi$.

It is to be understood that any suitable types of detectors may be used as detectors 17 and 19, including those of the superheterodyne type.

It will be seen that the measuring circuit of Fig. 1 is rendered substantially independent of the frequency $f_0$, since this frequency has no effect whatever upon the resultant inputs to indicators 18 or 26. Accordingly, this frequency $f_0$ may be varied over a complete range, if desired, and the corresponding phase shifts directly read off from indicators 18 or 26.

In addition, it will be observed that the measurement of the phase shift of a high radio frequency wave has been converted into the measurement of the amplitude of a low fixed frequency wave. Both of these points are advantages in the present system hitherto unrealizable in practice.

Fig. 4 shows a further modification of the system of Fig. 1 and similar elements have been denoted by similar reference characters. In Fig. 4 the circuit is exactly the same as in Fig. 1 up to the outputs of the amplitude modulation detector 17 and FM detector 19. As was observed above with respect to Fig. 1, these waves have wave shapes respectively represented by cos $\phi$ cos $\omega_1 t$ and sin $\phi$ sin $\omega_1 t$. These waves are then additively combined in a further combining circuit 27, whose output therefore will have the wave shape cos $(\omega_1 t - \phi)$. Accordingly, in this manner the phase shift $\phi$ of the wave at the high radio frequency $f_0$ has been converted into an identical phase shift $\phi$ of the wave of low frequency $f_1$. This phase shift $\phi$ may then be indicated or measured by a suitable low frequency phase meter 28 which may be of any type well known in the art.

Accordingly, by this modification the measurement of the phase shift of a high radio frequency wave has been converted into a measurement of phase shift at a low frequency which may be easily and accurately performed in any well known manner.

It will be noted that in the above Figures 1 and 4, the inputs to the AM detector 17 and FM detector 19 are both at substantially the frequency $f_0$, which is usually variable over considerable range. The usual type of square law AM detector is well adapted to operate satisfactorily with widely varying frequency inputs. However, the usual type of FM detector requires a single frequency input and accordingly the detector 19 of the above figures must be of the type adapted to operate satisfactorily with widely varying frequency inputs. Alternatively, the operating frequency of detector 19 may be ganged with that of oscillator 11 to vary together.

In order to avoid these restrictions on the FM detector 19, recourse may be had to the circuit of Fig. 5. In this instance, the circuit is substantially the same as that of Fig. 4, with the added elements to be described. Thus, an intermediate frequency oscillator 31 is provided having a fixed frequency $f_2$, which is preferably separated from the usual values of the high frequency $f_0$ at which measurements are to be made by a substantial frequency difference. The output of oscillator 31 then will have a wave shape cos $(\omega_2 t)$. This is combined with the output of oscillator 11, having wave shape cos $(\omega_0 t)$, in a suitable frequency converter 32 of any conventional type adapted to produce in its output a wave having a frequency equal to the difference between the frequencies of the waves supplied thereto. Accordingly, the output of frequency converter 32 will have the wave shape cos $(\omega_0 - \omega_2) t$. This latter wave is then combined with the output of combining circuit 16, obtained in the same manner as in Figs. 1 and 4, in a further similar frequency converter 33. Since the output of combining circuit 16 has a wave shape of the form cos $(\omega_0 t - \phi) +$ cos $(\omega_1 t)$ cos $(\omega_0 t)$, it will be seen that the output of the frequency converter 33 will then have the wave shape $$\cos (\omega_2 t - \phi) + \cos (\omega_1 t) \cos (\omega_2 t)$$

This latter wave shape will be seen to constitute the same relative component as formerly supplied to the detectors 17 and 19 in Figs. 1 and 4, but now referred to the fixed intermediate frequency $f_2$ instead of variable high frequency $f_0$. Accordingly, the detectors 17 and 19 may now be constructed to operate at a single fixed input frequency $f_2$, whereby their efficiency, simplicity and general characteristics may be greatly improved. The outputs of detectors 17 and 19 are then utilized in the same manner as in Fig. 4 to supply an indication of the phase shift of the test apparatus 12.

Fig. 6 shows a further modification adapted to produce the same result as that of Fig. 5. However, in this instance the frequency conversion of the waves of frequency $f_0$ to the intermediate frequency $f_2$ is performed ahead of the combining circuit 16, instead of after as in Fig. 5, by means of suitable frequency converters 34 and 35 which respectively convert the waves output from the test apparatus 12 and the balanced modulator 14 into corresponding waves at the frequency $f_2$, which are thereupon combined in the combining circuit 16 and supplied to the detectors 17 and 19 to be utilized in the same manner as in the previous modifications.

It is to be understood that in any of the circuits of Figs. 4, 5 or 6, the outputs of the detectors 17 and 19 may be utilized separately in the manner shown in Fig. 1, if desired.

Fig. 7 shows another embodiment of the present invention which is somewhat simpler than the preceding forms. In this instance, the high frequency wave output of oscillator 11, of frequency $f_0$, is combined with that of the low frequency oscillator 13, having frequency $f_1$, in a frequency converter 36 to provide an output therefrom of frequency $f_0 - f_1$. This wave is then supplied to a second frequency converter 37 together with the output from the test apparatus 12 having wave shape cos $(\omega_0 t - \phi)$. The output of frequency converter 37 will therefore have the wave form cos ($\omega_1 t - \phi$) and this wave may be compared with the output of oscillator 13, as by means of indicator 28, to provide an indication of the phase shift in the test apparatus 12.

In this instance, the frequency of oscillator $f_1$ cannot be quite so low as in the previous modifications, since the difference frequency $f_0 - f_1$ must be sufficiently far removed from, (that is, must have a large enough frequency difference with respect to) frequency $f_0$ to permit satisfactory separation of these frequencies by means of frequency converter 36, and to permit satisfactory separation of the frequency $f_1$ from the remaining frequencies $f_0$ and $f_0 - f_1$ in frequency converter 37.

Although the above description has been confined to the measurement of the phase shift of a test apparatus, it will be clear that the present system may also be used to measure radio frequency phase differences. Thus, in all the figures, oscillator 11 and test apparatus 12 may be eliminated, and their outputs replaced by two waves whose phase difference is to be measured, as by connection to terminals A and B. The operation of the system then remains the same, and the required phase difference is measured in the manner described above.

Accordingly in the above manner, there is provided a convenient and simple apparatus for measuring phase shift or phase difference at a high radio frequency which may be varied over wide ranges. The entire phase characteristic of any piece of apparatus may be thus determined simply by varying the frequency of oscillator 11 over the desired range.

It will be clear that a suitable recorder may be utilized instead of indicator 28, whereby the actual frequency versus phase characteristics of the test apparatus 12 may be directly recorded.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for measuring the high frequency phase shift produced by test apparatus, comprising a source of adjustable high frequency wave, means for energizing said test apparatus from said source to produce an output wave of the same frequency as the output wave of said source but phase-shifted with respect to the output wave of said source by an amount to be measured, a source of low frequency wave, means for modulating one of said high frequency waves by said low frequency wave and for suppressing the carrier frequency component of the resultant modulated wave, means for additively combining said suppressed-carrier wave with the other of said high frequency waves, a source of fixed intermediate frequency wave, means for converting said combined wave into a corresponding wave at said intermediate frequency, means responsive to said converted wave for producing a wave of said low frequency phase-shifted with respect to said low frequency wave by said phase shift to be measured, and means for comparing the phases of said low frequency waves to indicate said phase shift, whereby said phase shift may be measured for varying high frequencies.

2. Apparatus for measuring the high frequency phase shift produced by test apparatus, comprising a source of adjustable high frequency wave, means for energizing said test apparatus from said source of high frequency to produce an output high frequency wave of the same frequency as the output wave of said source but phase-shifted with respect to the output wave of said source by an amount to be measured, a source of low frequency wave, means for modulating one of said high frequency waves by said low frequency wave and for suppressing the carrier frequency component of said resultant modulated wave, means for converting both said carrier-suppressed wave and the other of said high frequency waves into corresponding waves at a fixed intermediate frequency, means for additively combining said converted waves, means responsive to said combined wave for producing a wave of low frequency phase-shifted with respect to said first low frequency wave by said phase shift to be measured, and means for comparing the phases of said low frequency waves to indicate said phase shift, whereby said phase shift may be measured for varying high frequencies.

3. Apparatus for measuring the high frequency phase shift produced by test apparatus, comprising a source of adjustable high frequency wave, means for energizing said test apparatus from said source to produce an output high frequency wave of the same frequency as the output wave of said source but phase-shifted with respect to the output wave of said source by an amount to be measured, a source of low frequency wave, means for modulating one of said high frequency waves by said low frequency wave and for suppressing the carrier frequency component of the resultant modulated wave, means for additively combining said suppressed-carrier wave with the other of said high frequency waves, means responsive to said combined wave for producing a wave of said low frequency phase-shifted with respect to said first low frequency wave by said phase shift to be measured, and means for comparing the phases of said low frequency waves to indicate said phase shift, whereby said phase shift may be measured for varying high frequencies.

4. Apparatus for measuring the high frequency phase shift produced by test apparatus, comprising a source of high frequency wave, means for applying said wave to said test apparatus to produce an output wave of the same frequency as the output wave of said source but phase-shifted with respect to said first high frequency wave, a source of low frequency wave, means jointly responsive to said waves for producing a second low frequency wave having a low frequency phase difference with respect to said low frequency wave equivalent to the high frequency phase shift, and means for indicating said low frequency phase difference to indicate said high frequency phase shift, whereby said high frequency phase shift may be measured for varying high frequencies.

5. Apparatus for measuring the high frequency phase shift of test apparatus, comprising a source of high frequency wave, means for applying said wave to said test apparatus to produce an output wave therefrom of the same frequency as the output wave of said source but phase-shifted with respect to said first high frequency wave, a source of low frequency wave, means for deriving from said waves a further wave of said low frequency having an amplitude corresponding to said phase shift, and means for separately indicating the amplitude of said low frequency wave to indicate said phase shift, whereby said phase shift may be measured for varying high frequencies.

6. Apparatus for measuring the phase difference between two adjustable high frequency test waves of substantially equal frequency, comprising a source of fixed low frequency wave, means for modulating one of said test waves by said low frequency wave and for suppressing the carrier frequency component of the resultant modulated wave, means for combining said suppressed-carrier wave with the other of said test waves, fixed means for converting said combined waves into corresponding waves at a fixed intermediate frequency, means for amplitude modulation detecting said combined wave to produce a detected wave at said low frequency, means for frequency modulation detecting said combined wave to produce another detected wave at said low frequency, means for combining said detected low frequency waves, and means for comparing the phase of said original low frequency wave with that of said combined detected wave to indicate said phase difference at said low frequency, whereby said phase difference may be measured for varying high frequencies.

7. Apparatus for measuring the phase difference between two adjustable high frequency test waves of substantially equal frequency, comprising a source of fixed low frequency wave, means for modulating one of said test waves by said low frequency wave and for suppressing the carrier frequency component of the resultant modulated wave, means for converting both said suppressed-carrier wave and the other of said test waves into corresponding waves at a fixed intermediate frequency, means for combining said converted waves, means for amplitude modulation detecting said combined wave to produce a first detected wave, means for frequency modulation detecting said combined wave to produce another detected wave at said low frequency, means for combining said detected low frequency waves, and means for comparing the phase of said original low frequency wave with that of said combined detected wave to indicate said phase difference at said low frequency, whereby said phase difference may be measured for varying high frequencies.

8. Apparatus for measuring the phase difference between two adjustable high frequency test waves of substantially equal frequency, comprising a source of fixed low frequency wave, means for modulating one of said test waves by said low frequency wave and for suppressing the carrier frequency component of the resultant modulated wave, means for combining said suppressed-carrier wave with the other of said test waves, means for amplitude modulation detecting said combined wave to produce a detected wave at said low frequency, means for frequency modulation detecting said combined wave to produce another detected wave at said low frequency, means for electrically combining said detected low frequency waves, and means for comparing the phase of said original low frequency wave with that of said combined detected wave to indicate said phase difference at said low frequency, whereby said phase difference may be measured at varying high frequencies.

9. Apparatus for measuring the phase difference between two high frequency test waves of substantially equal frequency, comprising a source of low frequency wave, means for modulating one of said test waves by said low frequency wave and for suppressing the carrier frequency component of the resultant modulated wave, means for combining said suppressed-carrier wave with the other of said test waves, means responsive to said combined wave for producing a wave of said low frequency phase-shifted with respect to said first low frequency wave by an amount equivalent to said phase difference, and means for comparing the phase of said low frequency waves to indicate said phase difference at said low frequency, whereby said phase difference may be measured for varying high frequencies.

10. Apparatus for measuring the phase difference between two high frequency test waves of substantially equal frequency, comprising a source of fixed low frequency wave, means jointly responsive to said waves for producing a second low frequency wave having an equivalent phase difference at said low frequency, and means for indicating said low frequency phase difference to thereby determine said high frequency phase difference, whereby said phase difference may be measured for varying high frequencies.

11. Apparatus for measuring the phase difference between two high frequency test waves of substantially equal frequency, comprising a source of low frequency wave, means for modulating one of said test waves by said low frequency wave and for suppressing the carrier frequency component of the resultant modulated wave, means for combining said suppressed-carrier wave with the other of said test waves, means for amplitude modulation detecting said combined wave, and means for separately indicating the amplitude of said detected wave to thereby indicate said phase difference, whereby said apparatus is adapted to indicate said phase difference for varying high frequencies.

12. Apparatus for measuring the phase difference between two high frequency test waves of substantially equal frequency, comprising a source of low frequency wave, means for modulating one of said test waves by said low frequency wave and for suppressing the carrier frequency component of the resultant modulated wave, means for combining said suppressed-carrier wave with the other of said test waves, means for frequency modulation detecting said combined wave, and means for separately indicating the amplitude of said detected wave to thereby indicate said phase difference, whereby said apparatus is adapted to indicate said phase difference for varying high frequencies.

13. Apparatus for measuring the phase difference between two high frequency test waves of substantially equal frequency, comprising a source of low frequency wave, means for modulating one of said test waves by said low frequency wave and for suppressing the carrier frequency component of the resultant modulated wave, means for combining said suppressed-carrier wave with said second test wave, means for detecting said combined wave and producing a low frequency wave having the frequency of said modulation, and means responsive to phase difference between said low frequency waves, whereby said phase difference may be measured for varying high frequencies.

14. Apparatus for measuring the phase difference between first and second high frequency test waves of substantially the same frequency, comprising a source of low frequency wave, means for combining the low frequency wave and one of the high frequency waves to produce a combined output, means for combining said combined output and the other of said high frequency waves to produce a second low frequency wave having the same frequency as said low frequency source, and means for comparing said low frequency waves with respect to phase to determine the phase relation between the high frequency waves.

15. Apparatus for measuring the phase difference between first and second high frequency test waves having substantially the same frequency, comprising a source of low frequency wave, a source of intermediate frequency wave, means for modulating the first high frequency wave with the low frequency wave to produce a modulated output, means for combining the modulated output with the second high frequency wave, means for heterodyning the first high frequency wave with the intermediate frequency wave, means for heterodyning the heterodyne output with the combined wave output, means for detecting the last combination, and means for comparing the low frequency detected output in phase with the first low frequency wave to indicate the phase relationship between said high frequency waves.

16. Apparatus for measuring the phase difference between first and second high frequency test waves having substantially the same frequency, comprising a source of low frequency wave, a source of intermediate frequency wave, means for modulating the first high frequency wave with the low frequency wave to produce a modulated wave, means for heterodyning the first high frequency wave to produce a first difference wave, and means for heterodyning and combining said first difference wave, said second high frequency wave, and said modulated wave to produce a combined output with means for deriving therefrom a low frequency having a phase relationship with respect to said first low frequency wave indicative of phase relation between said first and second high frequency waves.

17. Apparatus for measuring the phase difference between first and second high frequency test waves having substantially the same frequency, comprising a source of low frequency wave, means for modulating the first test wave by the low frequency wave to produce a resultant modulated wave, means for combining the modulated wave with the second test wave, means for demodulating the combined wave to produce a second low frequency wave of the same frequency as said mentioned low frequency wave, and means for comparing the phase relationship of said low frequency waves to produce an indication of said phase relationship between said high frequency waves.

18. The method of measuring the phase shift of test apparatus for variable high frequencies, comprising the steps of applying a variable high frequency input wave to said test apparatus to produce an output wave therefrom of the same frequency as the said input wave, but phase shifted with respect to said input wave, generating a low frequency wave, modulating said high frequency input wave with said low frequency wave, and eliminating the carrier wave to produce sidebands, combining said sidebands with said high frequency output wave, and demodulating the combination of said waves to produce a second low frequency wave of the same frequency as said first low frequency wave, but having a phase shift corresponding to the phase shift of the high frequency wave, and comparing the phase relationship between said low frequency waves to obtain an indication of the phase shift of the high frequency waves.

19. The method of measuring the phase difference between first and second high frequency waves of substantially equal frequency, comprising the steps of generating a low frequency wave, modulating one of said high-frequency waves by said low frequency wave to produce a modulated wave, suppressing the carrier frequency component of the modulated wave to produce sidebands, additively combining said sidebands with said other test wave, demodulating the combination to produce a second low frequency wave having the same frequency as the first-mentioned low frequency wave and comparing the low frequency waves in phase to obtain an indication of the phase difference between the two high frequency waves.

20. The method of measuring the phase difference between two variable high frequency waves of substantially equal frequency, comprising the steps of generating a low frequency wave, modulating one of said high frequency waves with the low frequency wave, combining the other of said high frequency waves with said modulated wave, demodulating the combination to produce a second low frequency wave, and ascertaining the phase relationship between said low frequency waves to obtain an indication of the phase relationship between the two high frequency waves.

21. The method of measuring the phase difference between two variable high frequency waves of substantially equal frequency, comprising the steps of generating a low frequency wave, modulating one of said high frequency waves with said low frequency wave, combining the other of said high frequency waves with said modulated wave, demodulating the combination of said waves to produce a second low frequency wave having an amplitude variable in response to variations in phase relationship between said high frequency waves and measuring the amplitude of said second low frequency wave.

22. The method of measuring the phase difference between two variable high frequency waves having substantially the same frequency, comprising the steps of generating a low frequency wave, modulating one of said high-frequency waves by the low frequency wave to produce a modulated wave, combining the modulated wave with the other of said test waves, demodulating the combination to produce a low frequency wave variable in response to variations in phase relationship between said high frequency test waves and indicating variations in said second low frequency wave to indicate variations in phase relationship between said high frequency waves.

WILLIAM W. HANSEN.
MORRIS RELSON.

REFERENCES CITED

The following references are of record in the file of this patent:

UNITED STATES PATENTS

| Number | Name | Date |
| --- | --- | --- |
| 2,305,614 | Goldstein | Dec. 22, 1942 |
| 2,063,074 | Armstrong | Dec. 8, 1936 |